US008345180B2

(12) United States Patent
Chiu et al.

(10) Patent No.: US 8,345,180 B2
(45) Date of Patent: Jan. 1, 2013

(54) BACKLIGHT MODULE WITH METALLIC BRACKET CONNECTING WITH THE METALLIC BEAM OF THE FRAME AND LIQUID CRYSTAL DISPLAY DEVICE USING THE SAME

(75) Inventors: Kuan-Her Chiu, Taipei Hsien (TW); Irene Chen, Taipei Hsien (TW)

(73) Assignee: Advanced Optoelectronic Technology, Inc., Hsinchu Hsien (TW)

( * ) Notice: Subject to any disclaimer, the term of this patent is extended or adjusted under 35 U.S.C. 154(b) by 423 days.

(21) Appl. No.: 12/714,551

(22) Filed: Mar. 1, 2010

(65) Prior Publication Data
US 2010/0225846 A1 Sep. 9, 2010

(30) Foreign Application Priority Data

Mar. 6, 2009 (TW) .............................. 98107259 A

(51) Int. Cl.
*G02F 1/1333* (2006.01)
*F21V 7/04* (2006.01)
(52) U.S. Cl. .......... 349/58; 362/612; 362/555; 362/632; 362/633; 362/634
(58) Field of Classification Search .................... 349/58; 362/612, 55, 633, 634, 632, 32, 31, 29; 257/88
See application file for complete search history.

(56) References Cited

U.S. PATENT DOCUMENTS

| 6,751,090 | B1 * | 6/2004 | Yang ........................ 361/679.06 |
| 7,407,316 | B2 * | 8/2008 | Noh et al. ..................... 362/612 |
| 7,667,955 | B2 * | 2/2010 | Takeda ..................... 361/679.21 |
| 2006/0012989 | A1 * | 1/2006 | Lee ................................. 362/231 |
| 2008/0297681 | A1 | 12/2008 | Yang et al. |
| 2009/0196035 | A1 * | 8/2009 | Cheng et al. .................. 362/246 |

FOREIGN PATENT DOCUMENTS

CN 101373289 A 2/2009

* cited by examiner

*Primary Examiner* — Hoan C Nguyen
(74) *Attorney, Agent, or Firm* — Altis Law Group, Inc.

(57) ABSTRACT

An exemplary liquid crystal display device includes a backlight module, a metallic bracket and a liquid crystal panel. The backlight module includes a back bezel, a planar lighting source mounted on the back bezel and a frame. The frame includes a metallic beam and three plastic beams. The metallic beam and the plastic beams enclose the back bezel. The metallic beam is located at a top of the liquid crystal display device. The metallic bracket supports the backlight module and thermally connects with the metallic beam of the frame of the backlight module. The liquid crystal panel is located at a surface of emission of the planar lighting source.

8 Claims, 6 Drawing Sheets

BACKLIGHT MODULE WITH METALLIC BRACKET CONNECTING WITH THE METALLIC BEAM OF THE FRAME AND LIQUID CRYSTAL DISPLAY DEVICE USING THE SAME

BACKGROUND

1. Technical Field

The present disclosure generally relates to backlight modules and, more particularly, to a backlight module with a heat dissipating member, and a liquid crystal display device incorporating the backlight module.

2. Description of Related Art

Recently, liquid crystal display devices have been in widespread use as display devices for compact electronic apparatuses. Typical liquid crystal display devices not only provide good quality images with little power consumption, but also are very thin. The liquid crystal in a liquid crystal display device does not emit any light itself. The liquid crystal has to be lighted by a light source so as to clearly and sharply display text and images. Thus, a backlight module is generally needed for a liquid crystal display device.

Referring to FIG. 1, a conventional backlight module 10 in a liquid crystal display device (not shown) includes a frame 11 and a bezel 12. The frame 11 is made of plastic material. The frame 11 includes two long side walls 111 and two short side walls 112. The bezel 12 is made of a metal piece. The bezel 12 includes a plate-shaped body 123, two long side plates 121 and two short side plates 122 extending from edges of the bezel 12. The long side walls 111 attach and cover the side plates 121 of the bezel 12. The side walls 111, 112 extend a plurality of catches (not labeled), and the side plates 121, 122 define a plurality of catch holes (not labeled) corresponding to the catches. Each of the catches of the side walls 111, 112 engages in a corresponding one of the catch holes of the side plates 121, 122, whereby the frame 11 and the bezel 12 are assembled together.

A part of heat generated by a light source in the backlight module 10 is absorbed by the bezel 12, and the other part of the heat is transferred by air flow inside the frame 11. Referring to FIG. 2, a heat path 21 of the conventional backlight module 10 is disclosed. Since the liquid crystal display device is vertically disposed for use, heated air in the backlight module 10 flows upwardly to top one of the long side walls 111. Nevertheless, the frame 11 is made of plastic material with low heat conductivity; thus, the heat is difficult to be transferred to ambient air via the side wall 111. The heated air accumulates in a top 23 of the backlight module 10 and slowly flows to the side walls 112 along a second heat path 22; it is difficult to transfer the heat to the ambient air. Thus, a heat dissipation efficiency of the liquid crystal display device is low. An accumulation of the heat may influence the performance and reliability of both the light source and electrical elements.

Another conventional backlight module includes a metallic frame and metallic bezel. The metallic frame is made of four metallic bars connecting to each other in series or integrally folded by a metallic plate. The metallic frame can quickly transfer heat generated in the backlight module to the ambient air. However, the metallic material of the frame makes the backlight module and the liquid crystal display device incorporating the backlight module somewhat costly and heavy.

What is needed, therefore, is a backlight module and a liquid crystal display device incorporating the backlight module which can overcome the above-described deficiencies.

DETAILED DESCRIPTION

Figure 1:
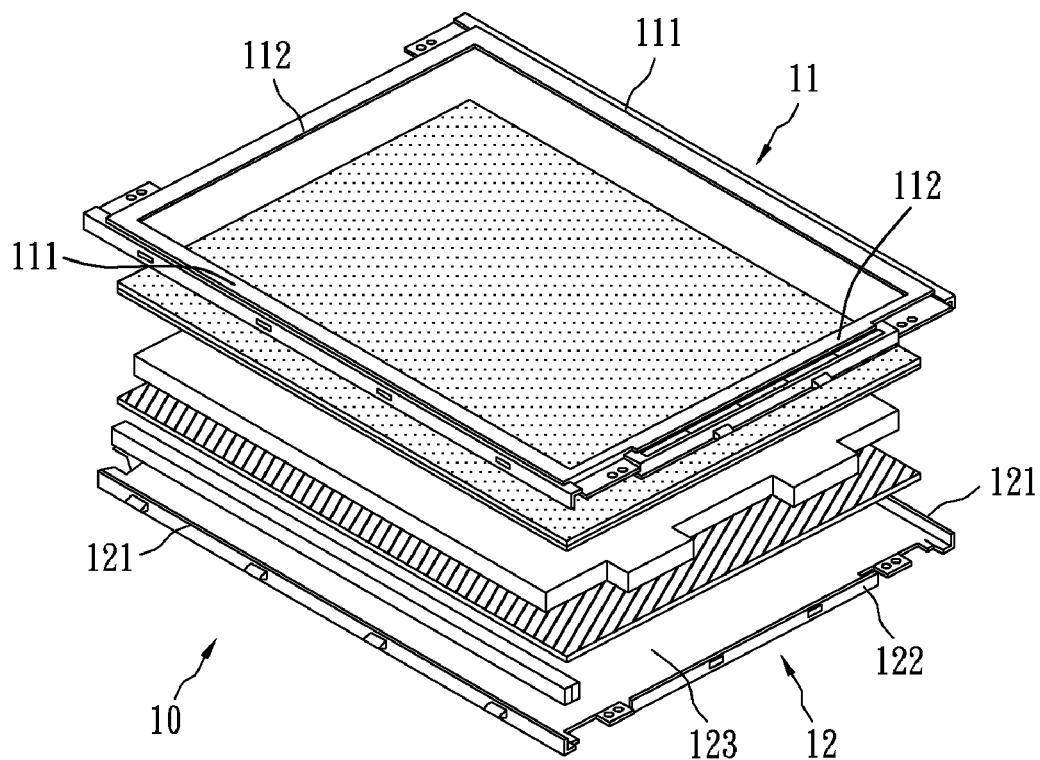
FIG. 1 is an isometric, exploded view of a backlight module in accordance with the related art.
Figure 2:
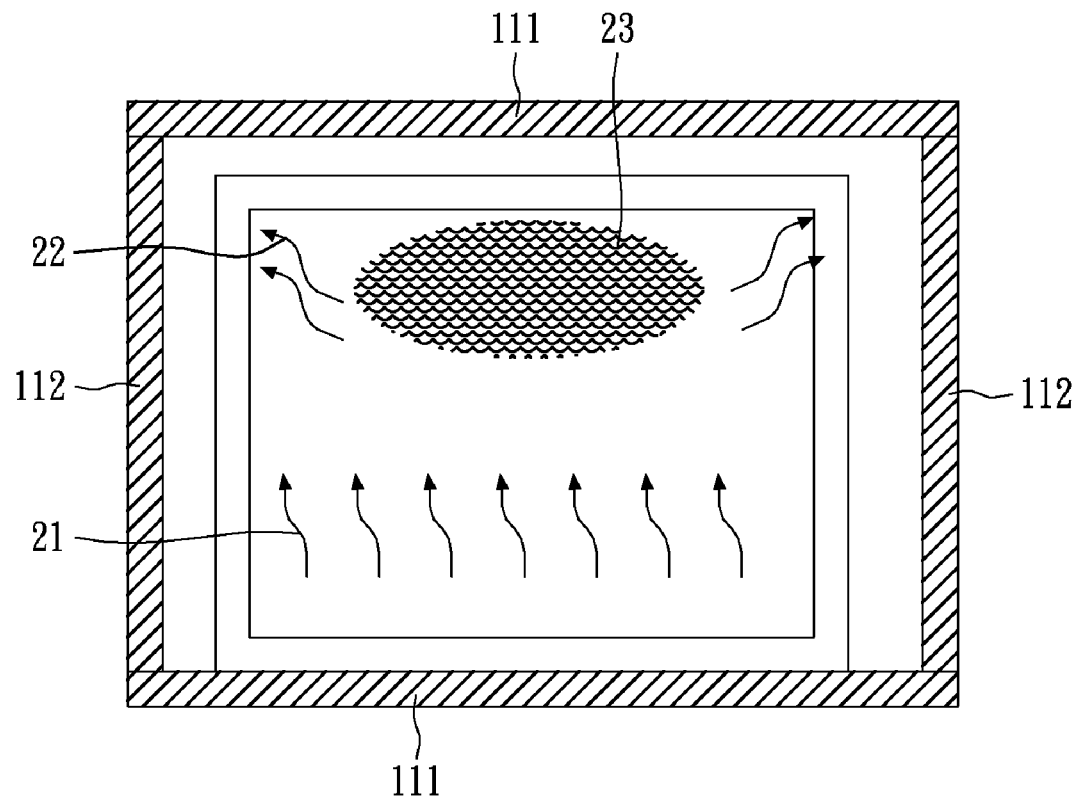
FIG. 2 is a schematic view of heat paths of the backlight module of FIG. 1.
Figure 3:
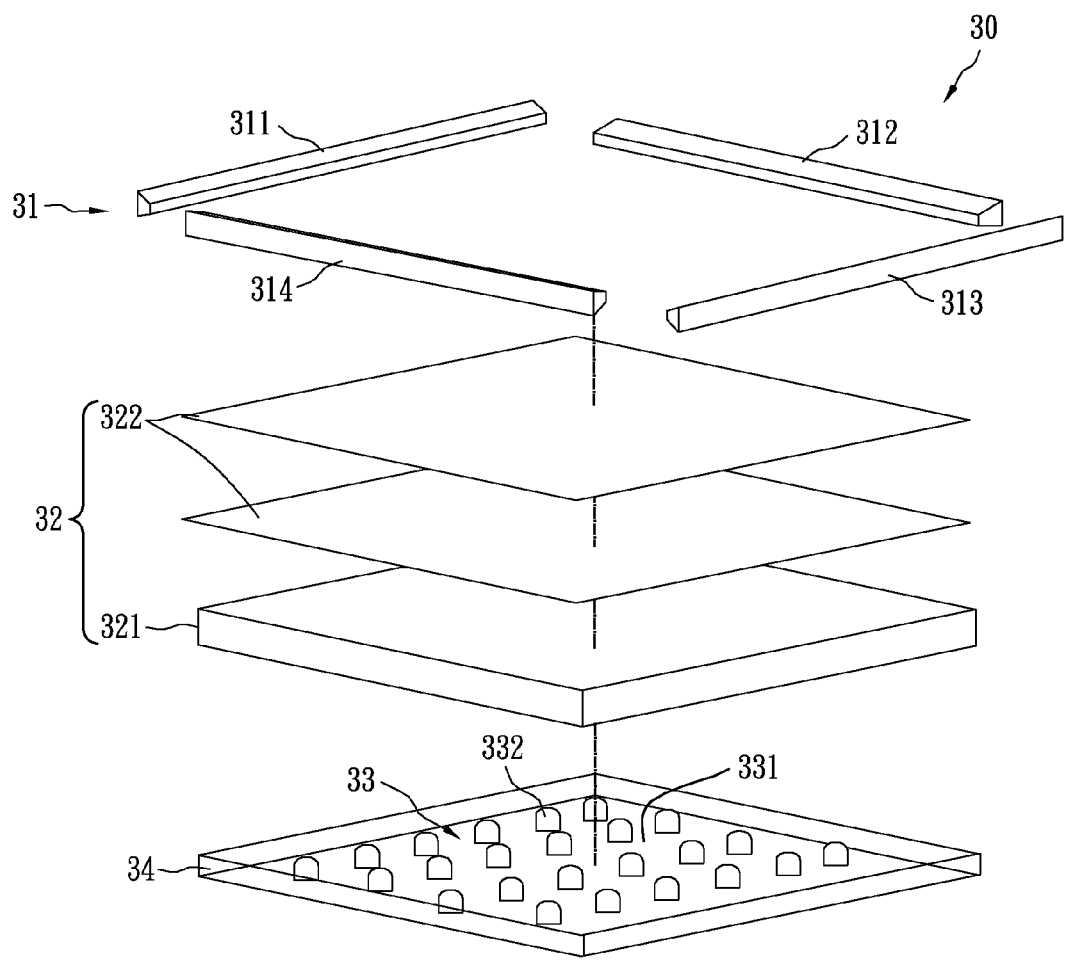
FIG. 3 is an exploded, isometric view of a backlight module according to a first embodiment of the present disclosure.
Figure 4:
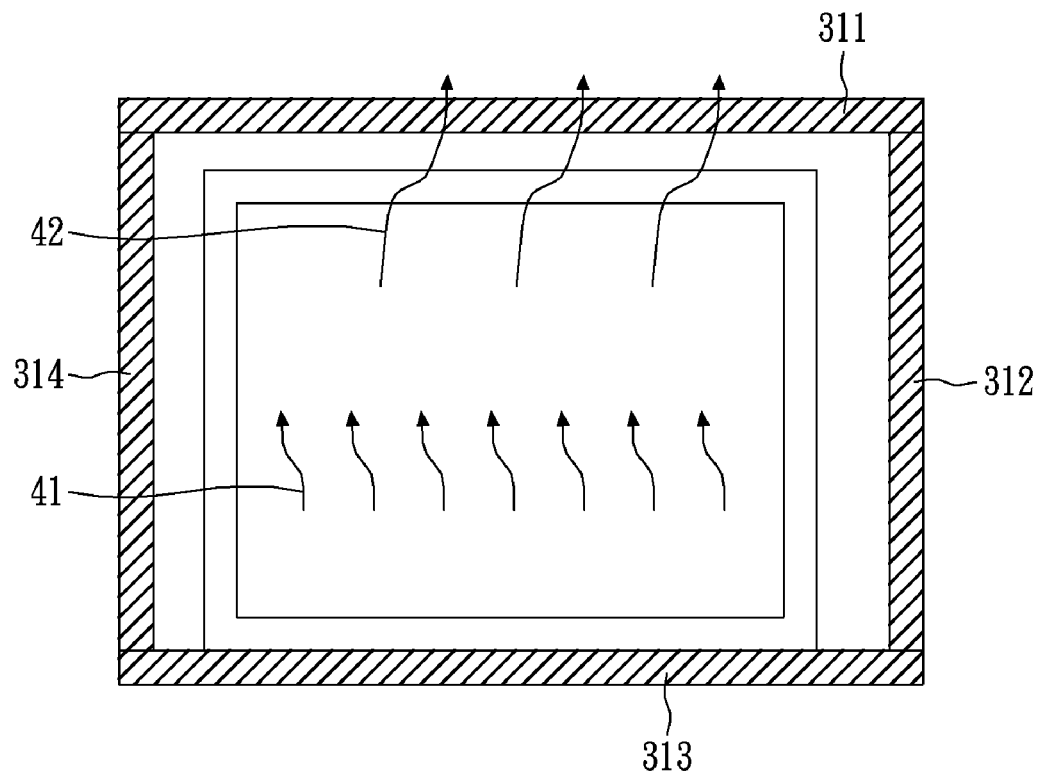
FIG. 4 is a schematic view of heat paths of the backlight module of FIG. 3.
Figure 5:
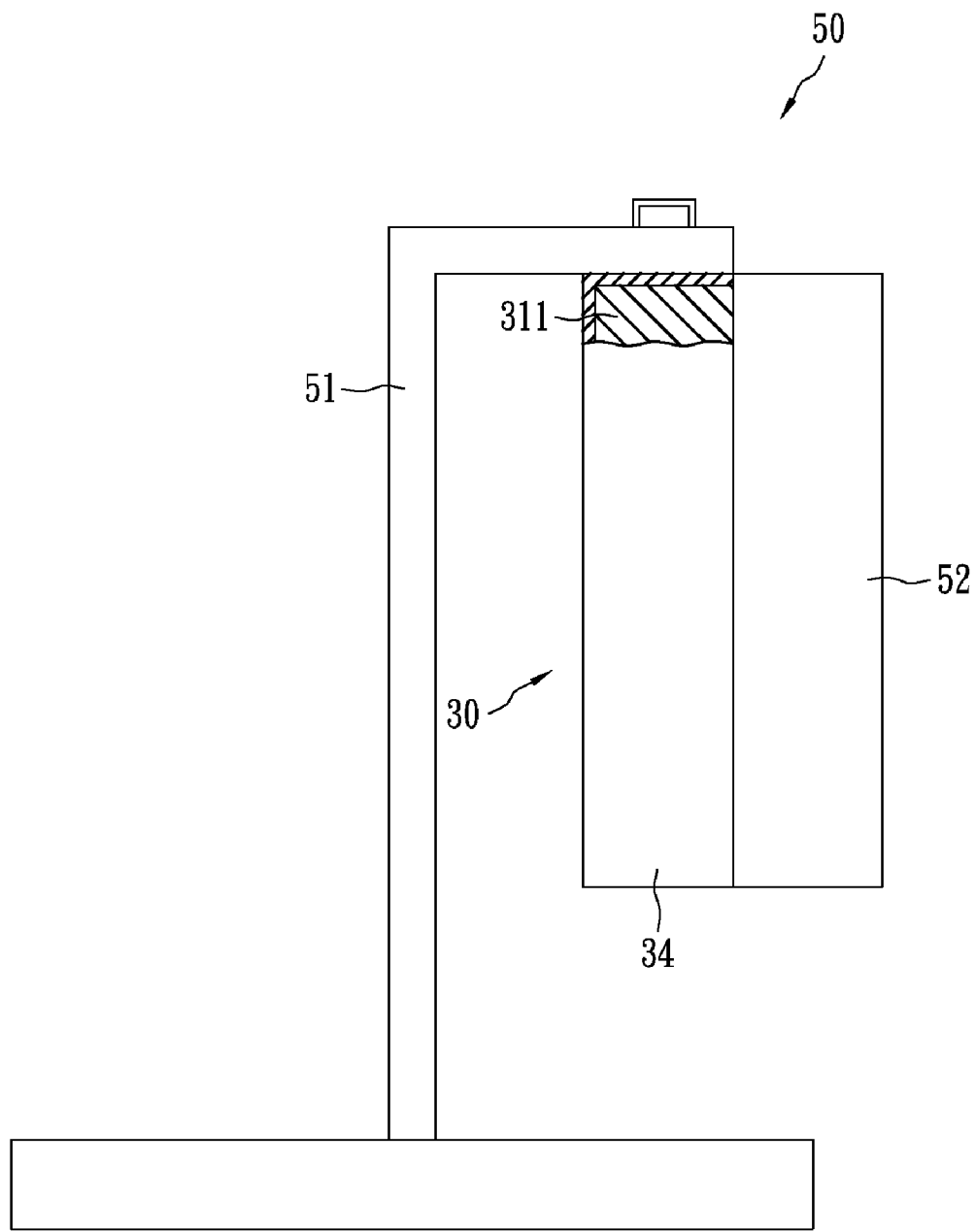
FIG. 5 is an isometric, assembled view of a liquid crystal display device incorporating the backlight module of FIG. 3.

Referring to FIGS. 3-5, a liquid crystal display device 50 in accordance with a first embodiment of the disclosure is illustrated. The liquid crystal display device 50 comprises a liquid crystal panel 52, a backlight module 30 secured to a rear side of the liquid crystal panel 52, and a metallic bracket 51 connecting with and supporting the backlight module 30 (see FIG. 5). The backlight module 30 is a direct type backlight module which can serve as a backlight source for the liquid crystal display device 50. The backlight module 30 comprises a back bezel 34, a frame 31, a planar lighting source 33 and an optical film assembly 32 located at a surface of emission of the planar lighting source 33.

The frame 31 comprises a metallic upper beam 311, a plastic left beam 312, a plastic bottom beam 313, and a plastic right beam 314. The metallic beam 311 and the plastic beams 312, 313, 314 are located at four sides of the back bezel 34 and around the planar lighting source 33 and the back bezel 34. The planar lighting source 33 is mounted on the back bezel 34. The planar lighting source 33 comprises a base 331 and a plurality of light emitting diodes (LEDs) 332 mounted on the base 331. The metallic upper beam 311 is located at a position corresponding to an upper side of the liquid crystal display 50. The metallic upper beam 311 can be made by aluminum extrusion or made of sheet metal.

The optical film assembly 32 comprises a diffusion plate 321 and two brightness enhancement films 322 on the diffusion plate 321. An evenness of light emitted by the LEDs 332 of the planar lighting source 33 increases via the diffusion plate 321. The light projecting through brightness enhancement films 322 is directed in specific angle to the liquid crystal panel 52 of the liquid crystal display device 50.

The liquid crystal display device 50 is located upright relative to the ground for users' watch. Heat generated by the working LEDs 332 is absorbed by the air in the backlight module 30. Heated air flows upwardly toward a top of the backlight module 30 along a first heat path 41. Heat in the heated air is transferred to the metallic upper beam 311 along a second heat path 42 and dissipated to ambient air. Therefore, the heat will not accumulate in a top of the backlight module 30 to influence the performance and reliability of the planar lighting source 33. Simultaneously, a small part of the heat can be transferred to the ambient air via the plastic left beam 312 and the plastic right beam 314.

Unlike the conventional backlight module 10 with a plastic frame 11 with four plastic side walls 111, 112, the backlight module 30 of the first embodiment comprises the metallic upper beam 311 for quickly dissipating heat generated by the planar lighting source 33, thereby helping to reduce the formation of a high heat concentration at an upper portion of the planar lighting source 33. In addition, unlike the conventional backlight module with a metallic frame consisting of four metallic bars which makes the backlight module costly and heavy, the plastic beams 312, 313, 314 of the frame 31 makes the backlight module 30 have a low cost and weight. Thus, the frame 31 with the metallic upper beam 311 and the plastic beams 312, 313, 314 can enhance heat dissipation capability of the backlight module 30 without increasing cost and weight thereof.

Referring to FIG. 5 again, the metallic upper beam 311 of the frame 31 can thermally connect with the metallic bracket 51 by soldering or screwing. Heat absorbed by the metallic upper beam 311 is transferred to the metallic bracket 51, and is dissipated to the ambient air by a large heat dissipating surface of the metallic bracket 51, thereby enhancing heat dissipation capability of the liquid crystal display device 50. Similarly, the metallic upper beam 311 can thermally connect with a metallic case (not shown) or an electromagnetic interference (EMI) shield (not shown) for dissipating the heat quickly.

Figure 6:
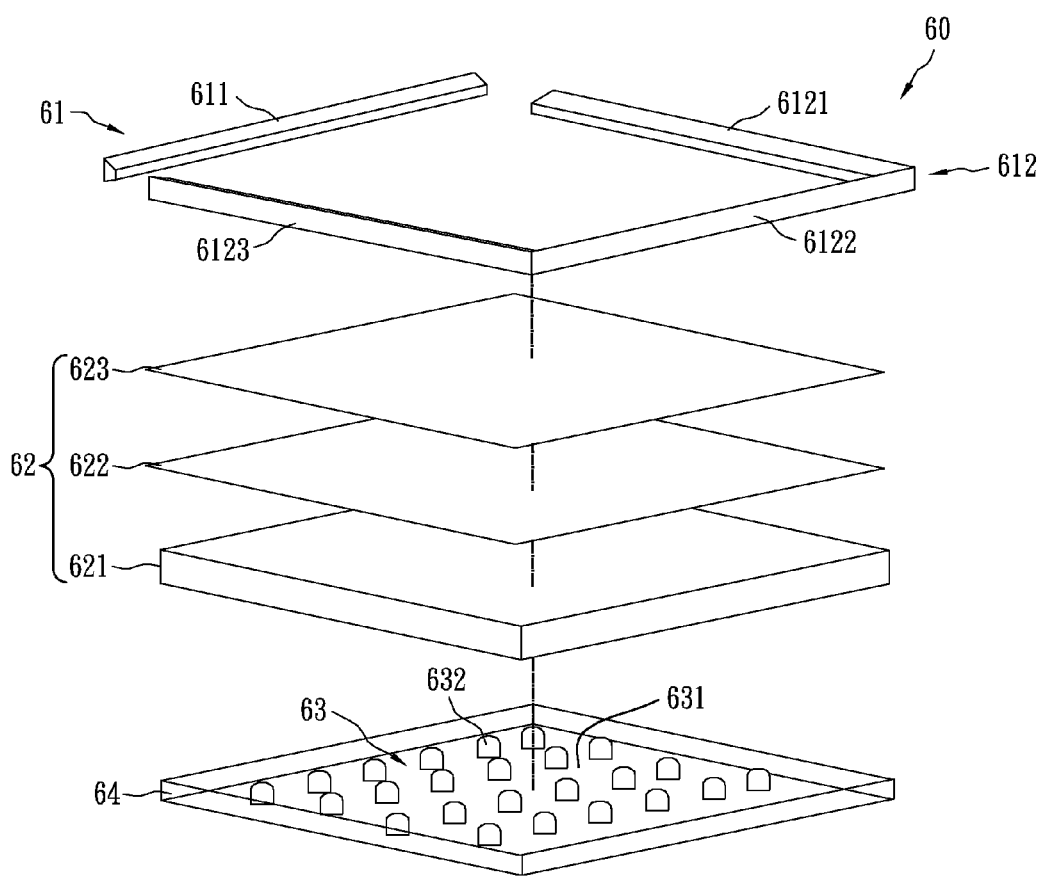
FIG. 6 is an exploded, isometric view of a backlight module according to a second embodiment of the present disclosure.

Referring to FIG. 6, a backlight module 60 in accordance with a second embodiment of the disclosure is illustrated. The backlight module 60 is a direct type backlight module which serves as a backlight source for a liquid crystal display device. The backlight module 60 comprises a back bezel 64, a frame 61, an optical film assembly 62 and a planar lighting source 63. The frame 61 comprises a metallic upper beam 611 and a plastic bracket 612. The plastic bracket 612 has a U-shaped configuration and comprises a right beam 6121, a bottom beam 6122, and a left beam 6123. The beams 6121, 6122, 6123 are integrally manufactured as one piece by injection molding. The metallic upper beam 611 and the plastic bracket 612 connect with each other via fasteners (not labeled) and enclose the back bezel 64. The metallic upper beam 611 is located at a top of the liquid crystal display device.

The planar lighting source 63 is mounted on the back bezel 64. The planer lighting source 63 comprises a base 631 and a plurality of light emitting diodes (LEDs) 632 mounted on the base 631. The optical film assembly 62 comprises a diffusion plate 621 and two brightness enhancement films 622. An evenness of light emitted by the LEDs 632 of the planar lighting source 63 is increased via the diffusion plate 621.

The metallic upper beam 611 can be integrally made by aluminum extrusion, or made by die-casting, or made of sheet metal. In this embodiment, the metallic upper beam 611 is made by aluminum extrusion; thus, the aluminum extrusion type beam 611 can be manufactured into different lengths by severing an extruded semi-finished product, without the necessity of redesigning a molding/die. Because of a cannular configuration of the metallic upper beam 611, the metallic upper beam 611 can receive electric wires of the backlight module 60 and prevent an abrasion of the electric wires. Aluminum material of the beam 611 makes the backlight module 60 have a great heat dissipation capability and low weight. In another embodiment, the metallic upper beam 611 can be made of sheet metal, which uses less material but has the same strength.

It is to be understood, however, that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A liquid crystal display device, comprising:
   a backlight module comprising:
   a back bezel;
   a planar lighting source mounted at the back bezel; and
   a frame comprising a metallic beam and a plurality of plastic beams, the metallic beam and the plastic beams enclosing the back bezel, the metallic beam being located at a top side of the liquid crystal display device;
   a metallic bracket supporting the backlight module and thermally connecting with the metallic beam of the frame of the backlight module; and
   a liquid crystal panel located at a surface of emission of the planar lighting source.

2. The liquid crystal display device of claim 1, wherein the backlight module is a direct type backlight module.

3. The liquid crystal display device of claim 1, wherein the metallic beam is made by aluminum extrusion or made of sheet metal.

4. The liquid crystal display device of claim 1, wherein the planar lighting source comprises a base and a plurality of LEDs mounted on the base.

5. The liquid crystal display device of claim 1, further comprising an optical film assembly located at a surface of emission of the planar lighting source.

6. The liquid crystal display device of claim 5, wherein the optical film assembly comprises a diffusion plate and two brightness enhancement films on the diffusion plate.

7. The liquid crystal display device of claim 1, wherein the three plastic beams are integrally formed as one piece by injection molding.

8. The liquid crystal display device of claim 1, wherein the metallic beam of the frame thermally connects with the metallic bracket by soldering or screwing.

* * * * *